United States Patent
Kuflik et al.

(10) Patent No.: US 11,388,260 B2
(45) Date of Patent: Jul. 12, 2022

(54) PROTOCOL FOR EXCHANGING USER MODEL DATA OBJECTS AMONG UBIQUITOUS DEVICES

(71) Applicant: CARMEL HAIFA UNIVERSITY ECONOMIC CORPORATION LTD., Haifa (IL)

(72) Inventors: Tsvi Kuflik, Modiin-Maccabim-Reut (IL); Yevgeni Mumblat, Haifa (IL); Eyal Dim, Modiin-Maccabim-Reut (IL)

(73) Assignee: CARMEL HAIFA UNIVERSITY ECONOMIC CORPORATION LTD., Haifa (IL)

( * ) Notice: Subject to any disclaimer, the term of this patent is extended or adjusted under 35 U.S.C. 154(b) by 0 days.

(21) Appl. No.: 17/275,418

(22) PCT Filed: Sep. 12, 2019

(86) PCT No.: PCT/IL2019/051024
§ 371 (c)(1),
(2) Date: Mar. 11, 2021

(87) PCT Pub. No.: WO2020/053863
PCT Pub. Date: Mar. 19, 2020

(65) Prior Publication Data
US 2022/0053070 A1  Feb. 17, 2022

Related U.S. Application Data

(60) Provisional application No. 62/730,693, filed on Sep. 13, 2018.

(51) Int. Cl.
*H04L 67/01* (2022.01)
*G06F 16/958* (2019.01)

(52) U.S. Cl.
CPC ............ *H04L 67/42* (2013.01); *G06F 16/958* (2019.01)

(58) Field of Classification Search
CPC .............................. H04L 67/42; G06F 16/958
(Continued)

(56) References Cited

U.S. PATENT DOCUMENTS 8,373,573 B2   2/2013   Chou et al.
9,946,233 B2 *  4/2018   Brun ..................... H04L 12/282
(Continued)

OTHER PUBLICATIONS

Dim, E., Kuflik, T., & Reinhartz-Berger, I. (2015). When user modeling intersects software engineering: the info-bead user modeling approach. User Modeling and User-Adapted Interaction, 25(3), 189-229. doi:10.1007/s11257-015-9159-1.
(Continued)

*Primary Examiner* — Wing F Chan
*Assistant Examiner* — Leon Y Tseng
(74) *Attorney, Agent, or Firm* — The Roy Gross Law Firm, LLC; Roy Gross

(57) ABSTRACT

A method comprising: automatically providing, by a client device to a server, information regarding the identity of data components comprising a user model stored at the client device, wherein each of said data components is associated with an attribute of a user of the client device; automatically identifying, by said server, data components that are missing in said user model, based, at least in part, on a reference model stored at said server; automatically sending, by said server, to said client device, said identified missing data components; automatically updating, by said client device, said user model to include said identified missing data components; and automatically sending, by said client
(Continued)

device, data contained in one or more of said data components in said updated user model, to enable a service provided by said server.

20 Claims, 8 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2007/0055725 A1* | 3/2007 | Bernardini | H04L 67/142 707/E17.117 |
| 2007/0179755 A1* | 8/2007 | Connally | G01R 31/3183 702/189 |
| 2011/0047251 A1 | 2/2011 | Seo | |
| 2013/0290339 A1 | 10/2013 | Luvogt et al. | |
| 2013/0332897 A1 | 12/2013 | Dim et al. | |
| 2017/0177686 A1* | 6/2017 | Biesemann | H04L 67/1095 |
| 2020/0211061 A1* | 7/2020 | Dasgupta | G06Q 30/0255 |

OTHER PUBLICATIONS

Heckmann et al., A user modeling markup language (UserML) for ubiquitous computing. In International Conference on User Modeling, Springer Berlin Heidelberg; 2003.
Heckmann et al., Decentralized user modeling with UserML and GUMO. In Decentralized, Agent Based and Social Approaches to User Modeling, Workshop DASUM-05 at 9th International Conference on User Modelling, UM2005 (2005).
Heckmann, D., Schwartz, T., Brandherm, B., Schmitz, M., & von Wilamowitz-Moellendorff, M. (2005) Gumo—The General User Model Ontology. Lecture Notes in Computer Science, 428-432. doi:10.1007/11527886_58.
Kay et al., Personis: A Server for User Models, De Bra, P. Brusilovsky, and R. Conejo (Eds.): AH 2002, LNCS2347, pp. 203-212, 2002.
Kobsa, A. (2001). User Modeling and User-Adapted Interaction, 11(1/2), 49-63. doi:10.1023/a:1011187500863.
Kuflik, T., Kay, J., & Kummerfeld, B. (2012). Challenges and Solutions of Ubiquitous User Modeling. Cognitive Technologies, 7-30. doi:10.1007/978-3-642-27663-7_2.
Wahlster et al., User Models in Dialog Systems, User Models in Dialog Systems. Berlin: Springer, pp. 4-34, 1989.
International Search Report of PCT/IL2019/051024 Completed Dec. 16, 2019; dated Dec. 19, 2019 2 pages.
Written Opinion of PCT/IL2019/051024 Completed Dec. 16, 2019; dated Dec. 19, 2019 5 pages.
Fink et al., "A Review and analysis of commercial user modeling servers for personalization on the world wide web" User Modeling and User-Adapted Interaction, Kluwer Academic Publishers, DO, vol. 10, No. 2-3, pp. 209-249.

* cited by examiner

PROTOCOL FOR EXCHANGING USER MODEL DATA OBJECTS AMONG UBIQUITOUS DEVICES

CROSS-REFERENCE TO RELATED APPLICATIONS

This application is a National Phase Application of International Application No, PCT/IL2019/051024, filed Sep. 12, 2019, which claims the benefit of priority under 35 U.S.C. § 119(e) of U.S. Provisional Patent Application No. 62/730,693, filed on Sep. 13, 2018, entitled "PROTOCOL FOR EXCHANGING USER MODEL DATA OBJECTS AMONG UBIQUITOUS DEVICES AND METHODS FOR USE THEREOF." The contents of the above applications are all incorporated by reference as if fully set forth herein in their entirety.

BACKGROUND

Mobile computing poses a big challenge to user modeling—how to provide users with personalized services anywhere and anytime, without requiring the user to bootstrap a user model (UM) from scratch every time. The basic, abstract challenge is to maintain an up-to-date UM. Today's technology provides solutions to this abstract challenge—the UM may be stored in the cloud or on the user's mobile device (or even both). However, the challenge remains in how the environment or service provider can access the UM and get the needed information from the model, and how can the UM (or the user-modeling component) respond to continuous requests for personal data required by services in ubiquitous computing.

Accordingly, it would be advantageous to provide for exchanging and composing UMs for providing the current service with the personal data needed for personalization.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: automatically providing, by a client device to a server, information regarding the identity of data components comprising a user model stored at the client device, wherein each of said data components is associated with an attribute of a user of the client device; automatically identifying, by said server, data components that are missing in said user model, based, at least in part, on a reference model stored at said server; automatically sending, by said server, to said client device, said identified missing data components; automatically updating, by said client device, said user model to include said identified missing data components; and automatically sending, by said client device, data contained in one or more of said data components in said updated user model, to enable a service provided by said server.

There is also provided, in an embodiment, a system comprising: at least one hardware processor; and a non-transitory computer-readable storage medium having stored thereon program code, the program code executable by the at least one hardware processor to: automatically provide, by a client device to a server, information regarding the identity of data components comprising a user model stored at the client device, wherein each of said data components is associated with an attribute of a user of the client device; automatically identify, by said server, data components that are missing in said user model, based, at least in part, on a reference model stored at said server; automatically send, by said server, to said client device, said identified missing data components; automatically update, by said client device, said user model to include said identified missing data components; and automatically send, by said client device, data contained in one or more of said data components in said updated user model, to enable a service provided by said server.

There is further provided, in an embodiment, a computer program product comprising a non-transitory computer-readable storage medium having program code embodied therewith, the program code executable by at least one hardware processor to: automatically provide, by a client device to a server, information regarding the identity of data components comprising a user model stored at the client device, wherein each of said data components is associated with an attribute of a user of the client device; automatically identify, by said server, data components that are missing in said user model, based, at least in part, on a reference model stored at said server; automatically send, by said server, to said client device, said identified missing data components; automatically update, by said client device, said user model to include said identified missing data components; and automatically send, by said client device, data contained in one or more of said data components in said updated user model, to enable a service provided by said server.

In some embodiments, said providing occurs when said client device enters a service zone controlled by said server.

In some embodiments, said attributes are associated with at least one of health traits, fitness traits, gender, age, preferences, physical traits, income, education, mental state, fitness activities, leisure activities, environmental parameters, and location of said user.

In some embodiments, at least some of said data components in said user model are configured to exchange data with one another.

In some embodiments, at least some of said data components are based, at least in part, on data obtained from one or more other data components.

In some embodiments, said updating comprises generating at least one of said identified missing data component from data received from an external computing platform.

In some embodiments, said updating comprises generating at least one of said identified missing data component from data received from another data component.

In some embodiments, said client device is one of a smart phone, a tablet, a personal computer, a laptop computer, and an internet appliance.

In some embodiments, said server is a cloud-based server.

In some embodiments, said enabling comprises personalizing said service for said user based, at least in part, on said sending.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
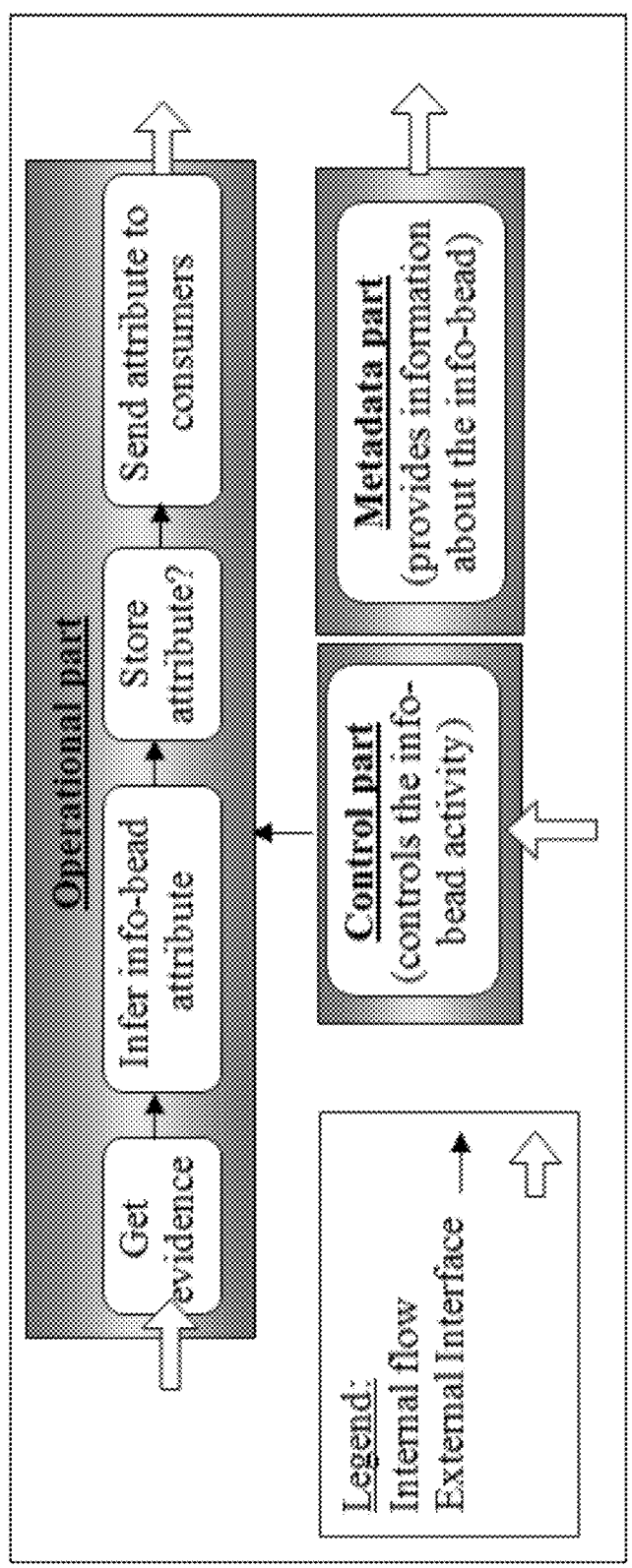
FIG. 1 is a schematic illustration of an info-bead, according to an embodiment.

Disclosed herein are a system, method and computer program product for automatically analyzing a video sequence of images depicting at least one object, and determining with a high degree of accuracy whether the object comprises live skin Over the years, computerized systems evolved from the "one-size-fits-all" paradigm to systems that provide personalized services to their users by using a "User Model" (UM)—a representation of users' preferences, knowledge, etc., that is needed for personalization of a service, and is continuously updated by a "User Modeling Component."

One UM may support several applications, thus the idea of user modeling servers was proposed to allow sharing of user modeling functions and content. When computers became mobile, and the idea of ubiquitous Computing was introduced, ubiquitous User Modeling appeared, focusing on how to support users in ubiquitous Computing. However, while user modeling research led to important contributions, current systems that provide personalized services to their users still rely on their own proprietary UMs developed in an ad-hoc manner and as a result, force the user to bootstrap a separate model for every application/service, a requirement that becomes unacceptable in ubiquitous computing scenarios. The main reasons for this are:

(i) System developers focus on the specific characteristics of users in order to deliver a specific service (e.g., a movie recommendation);
(ii) Reusable user modeling components are not publicly available;
(iii) The user modeling community does not have commonly accepted standards for UMs and their structure; and finally,
(iv) The development of a standard and reusable UM that holds a comprehensive set of information-items requires a level of effort that is too high to be carried out for a single application.

Considering the above, the idea of info-beads User Modeling approach was suggested, following the ideas of component based software engineering, defining elementary components of UM that can be composed to form more abstract user models, as well as to be reused in multiple models. When such an approach is adopted, it paves the way for dynamic construction of UMs, as needed and when needed, hence providing the infrastructure needed for creating and extending UMs "on the fly" for personalized ubiquitous computing applications.

Accordingly, in some embodiments, the present disclosure provides for the idea of info-beads User Modeling, to be applied for dynamic construction of UMs in ubiquitous computing, where the user is not known and the personal information needed by the service does not necessarily exist.

As used herein, the term "info-bead" refers to an atomic user modeling component that supplies a single attribute of a user (or a group of users). For example, an info-bead may return the user's blood pressure, another info-bead may return her level of happiness, and two other info-beads may refer to whether the user is involved in a leisure activity and to her current location.

As used herein, the term "info-link" refers to a data exchange protocol that allows the transmission of an attribute's data from one info-bead to another. For example, an info-link may allow a location info-bead to send the location data to the leisure activity info-bead, which infers the probability that a user is involved in the leisure activity.

As used herein, the term "info-pendant" refers to a tree of info-beads, linked by info-links that support the generation of the attribute handled by the root info-bead. For example, an info-pendant may infer the user location from info-beads that handle GPS, Wi-Fi-based, and cellular positions. In this case the info-beads that handle the GPS, Wi-Fi-based, and cellular positions will be in the leaves of the info-pendant's tree, and the user location info-bead will be the root of the info-pendant. Info-links will connect the leaves to the root.

As used herein, the term "info-bead UM" refers to a collection of info-beads partially linked by info-links to generate networks that hold attributes of a single user. For example, an info-bead UM for a medical domain may contain a patient's blood pressure info-bead and, in addition, the location info-pendant for locating the patient within a hospital.

As used herein, the term "info-bead GM" refers to a collection of info-beads partially linked by info-links to generate networks that hold group attributes, info-bead UMs representing members in the groups, and info-bead GMs representing sub-groups. For example, an info-bead GM of a students' class may contain an info-bead GM of students (that contains info-bead UMs, each representing a different student), an info-bead UM of the teacher, and an info-bead of the average grade of the class.

As used herein, the term "ubiquitous computing (or "ubicomp") refers to a concept in software engineering and computer science where computing is made to appear anytime and everywhere, as for example described in (1) Kuflik, T., Kay, J. and Kummerfeld, B.: Challenges and Solutions of ubiquitous User Modeling. In Kuflik and Kruger (eds), ubiquitous Display Environments, Springer-Verlag, pp. 7-31, (2012); (2) Heckmann, D., Schwartz, T., Brandherm, B., & Kröner, A. (2005, July): Decentralized user modeling with UserML and GUMO. In Decentralized, Agent Based and Social Approaches to User Modeling, Workshop DASUM-05 at 9th International Conference on User Modelling, UM2005; (3) Heckmann, D., & Krueger, A. (2003, June): A user modeling markup language (UserML) for ubiquitous computing. In International Conference on User Modeling, Springer Berlin Heidelberg; (4) Heckmann, D., Schwartz, T., Brandherm, B., Schmitz, M., & von Wilamowitz-Moellendorff, M. (2005, July): Gumo—the general user model ontology, In International Conference on User Modeling, Springer Berlin Heidelberg; and (5) Weiser, M.: The Computer for the 21$^{st}$ Century. In Scientific American 265.3, pp. 94-104, (1991).

In contrast to desktop computing, ubiquitous computing can occur using any device, in any location, and in any format. A user interacts with the computer, which can exist in many different forms, including laptop computers, tablets and terminals in everyday objects such as a fridge or a pair of glasses. For example, the technologies which can support ubiquitous computing can include, but not limited to, Internet, advanced middleware, operating system, mobile code, sensors, microprocessors, new I/O and user interfaces, networks, mobile protocols, location and positioning and materials. In addition, ubiquitous computing can be characterized by a plethora of services that is offered to the user.

Additional relevant background may be found in, e.g., Heckmann D., Krueger A. (2003) A User Modeling Markup Language (UserML) for Ubiquitous Computing. In: Brusilovsky P., Corbett A., de Rosis F. (eds) User Modeling 2003. UM 2003. Lecture Notes in Computer Science, vol 2702. Springer, Berlin, Heidelberg; Heckmann, D., Schwartz, T., Brandherm, B., Schmitz, M., & von Wilamowitz-Moellendorff, M. (2005). Gumo—The General User Model Ontology. Lecture Notes in Computer Science, 428-432. doi: 10.1007/11527886_58; Kuflik, T., Kay, J., & Kummerfeld, B. (2012). Challenges and Solutions of Ubiquitous User Modeling. Cognitive Technologies, 7-30. doi:10.1007/978-3-642-27663-7_2; Dim, Eyal Kuflik, Tsvi Reinhartz-berger, Iris. (2015). When user modeling intersects software engineering: the info-bead user modeling approach. User Modeling and User-Adapted Interaction. 25. 10.1007/s11257-015-9159-1; D. Heckmann, T. Schwartz, B. Brandherm, and A. Kroner. Decentralized User Modeling with UserML and GUMO. In Proc. of the UM '05 DASUM Workshop, Edinburgh, UK, 2005; Kay J., Kummerfeld B., Lauder P. (2002) Personis: A Server for User Models. In: De Bra P., Brusilovsky P., Conejo R. (eds) Adaptive Hypermedia and Adaptive Web-Based Systems. AH 2002. Lecture Notes in Computer Science, vol 2347. Springer, Berlin, Heidelberg; Kobsa, Alfred and Sandra Carberry. "User Models in Dialog Systems." Symbolic Computation (1989); and Kobsa, Alfres. (2001). Generic User Modeling Systems. User Model. User-Adapted Interact. 11. 10.1023/A:1011187500863, the contents of each of which are incorporated herein by reference in their entirety.

The figures constitute a part of this specification and include illustrative embodiments of the present invention and illustrate various objects and features thereof. The drawings shown are not necessarily to scale, with emphasis instead generally being placed upon illustrating the principles of the present invention. Further, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a", "an", and "the" include In some embodiments, the inventive electronic systems are associated with ubiquitous devices (e.g., mobile electronic devices, smartphones, actuators, activators, switches, etc.) of users and server(s) in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). In some embodiments, a plurality of concurrent users can be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, the inventive computer communication protocol for exchanging data between user model data objects residing on servers and clients, including dynamic updating of user model data objects, and computer-implemented systems and methods for use thereof, allow to provide users with personalized services anywhere and anytime, without requiring the user to bootstrap a user model (UM) data object from scratch every time. In some embodiments, the present invention allows to maintain an up to date UM. In some embodiments, the present invention allows for user-modeling components to be exchanged and composed for providing the current service with the personal data needed for personalization. In some embodiments, the present invention allows for dynamic construction of UMs, as needed, when needed, hence providing the infrastructure needed for adapting and extending UMs "on the fly" for personalized ubiquitous computing applications.

In some embodiments, the present invention allows for utilizing "User Model" (UM) as, for example but not limiting to, a representation of users' preferences, knowledge, etc., that can be used for personalization of a service, and can be continuously updated by utilizing, for example but not limiting to, a "User Modeling Component" as disclosed in [Wahlster, W. and Kobsa, A:,. User Models in Dialog Systems, pp. 4-34, Springer Berlin Heidelberg, (1989)], enclosed herein in Appendix. In some embodiments, the present invention allows for utilizing a single UM to support several applications by utilizing, for example but not limiting to, user modeling servers to allow sharing of user modeling functions and/or content as disclosed in, e.g., Kobsa, A.: Generic User Modeling Systems. In User Modeling and User Adapted Interaction, 11, 49-63, (2001); Kay, J., Kummerfeld, B., and Lauder, P.: Personis: a Server for User Models. In Adaptive Hypermedia and Adaptive Web-Based Systems (pp. 203-212). Springer Berlin Heidelberg (2002). In some embodiments, the present invention allows to solve at least one of technological problems, such as but not limited to:

Allowing to exchange info-beads;

allowing to manage info-beads version configuration;

automatic and dynamic composition/modification of info-beads user models at run time;

sharing of data objects (i.e. info-beads) and data collected (i.e. data stored in info-beads) among any device capable of holding and managing info-beads (e.g. ubiquitous devices, ubiquitous sensors, client devices, servers, distributed data bases, distributed servers . . . );

compensating for periods of communication disconnections (e.g. working in an offline mode and resynchronization when communication is reestablished); and/or allowing control over privacy.

In some embodiments, to address at least one or more of the technological problems, the present invention allows to utilize info-beads User Modeling approach, for example as exemplified by [E. Dim, T. Kuflik, I. Reinhartz-Berger. 2015. When User Modeling Meets Software Engineering: The info-bead User Modeling Approach. User Modling and User Adapted Interaction. 25 (3), 189-229 ("Dim et al."), which is incorporated herein in its entirety. For example, in some embodiments, the present invention is directed to defining elementary components of UM to build more complex, multi-facet, user models, as well as to be reused in multiple models. In some embodiments, the present invention is directed to having the infrastructure needed for creating and/or extending UMs "on the fly" for personalized ubiquitous computing applications.

In some embodiments, the present invention allows to utilize data object in accordance with info-beads User Modeling for dynamic construction of UMs in ubiquitous computing, where the user is not known and the personal information needed by the service does not necessarily exist.

Figure 2:
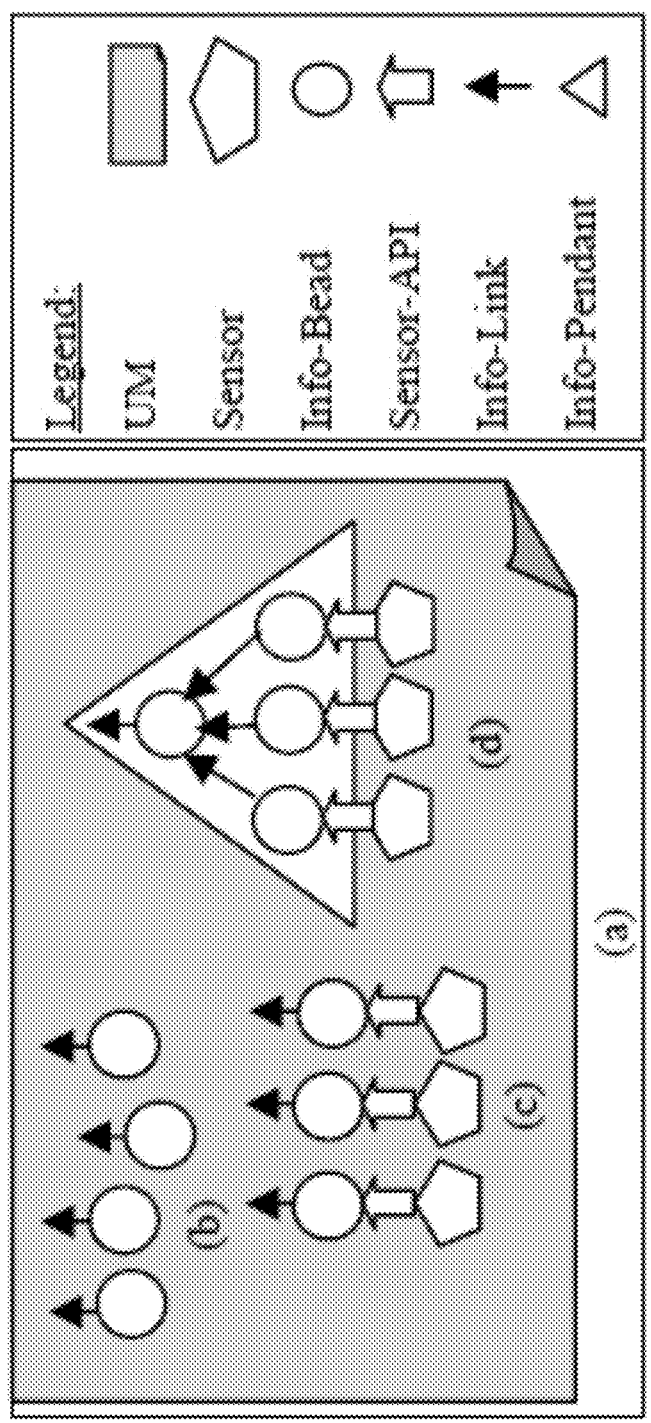
FIG. 2 presents an UM composed of a collection of info-beads, info-beads that get sensor's data, and one info-pendant, according to an embodiment.

In some embodiments, the present invention utilizes the development of UMs from reusable components, e.g., [Dim et al.] such as small, standard and reusable multipurpose building blocks that may be integrated into more complex UMs as needed. In some embodiments, the present invention utilizes the principles of information pendants (info-Pendants) made of information beads (info-beads) and their connecting threads (info-beads). In some embodiments, a selected collection of info-beads and info-Pendants becomes an UM. With reference to FIG. 1, an info-bead is an atomic user modeling data object component that provides a single attribute of a user (in addition to the specific value, the info-bead contains meta-data about the confidence and validity of the value and privacy policy about revealing it to external requesters. For example, in some embodiments, one info-bead may provide the user's blood pressure, while another info-bead may provide her current location. For example, in some embodiments, the info-bead may use attributes provided by sensors and/or by other info-beads to infer its own attribute. In some embodiments, the present invention allows for info-beads to communicate through an info-bead, utilizing a data exchange protocol that allows the transmission of an attribute's data from one info-bead to another. For example, an info-bead may allow a location info-bead to send the location data to a leisure activity info-bead, which infers the probability that a user is involved in the leisure activity. Furthermore, an info-pendant can be a tree of info-beads, linked by info-beads that support the generation of the attribute handled by its root info-bead. For example, a location info-pendant may infer the user's location from data provided by three info-beads that handle GPS positioning, Wi-Fi-based positioning, and cellular positions. Finally, an info-bead UM is a collection of info-beads partially linked by info-beads to generate networks that hold attributes of a single user. FIG. 2 presents an UM (a) composed of a collection of info-beads (b), info-beads that get sensor's data (c) and one info-pendant (d).

In some embodiments, the present invention allows to utilize standard, reusable info-beads for threading a new UM. In some embodiments, the present invention allows to associate the model with different users or to share the same information in multiple contexts. In some embodiments, the present invention allows to select info-beads and info-pendant s out of an available collection (some of them already used in a user's UM, while others are new to the user), in order to construct a partial UM for a specific service. In some embodiments, the present invention allows to construct UMs from simple and small info-beads based on the inventive principle of a global standard, offering a flexible opportunity for collaboration among UMs.

In some embodiments, the present invention allows to utilize a component-based UM architecture of the inventive info-beads User Modeling (IBUM) approach in any computing environment or ubiquitous computing environment, referred to as ubiquitous info-beads User modeling (UIBUM). In some embodiments, the present invention allows to utilize the UM which can be stored in the cloud and/or on the user's ubiquitous device. Such UM is continuously available and allows the user (or the user's agent) to seamlessly provide the personal information needed for personalizing any service, anywhere and anytime, whether the service is connected to the internet (and has access to the cloud or to any other computing environment), to any other network, or not connected. In some embodiments, the present invention allows to solve a technological problem of uncertainty of having no guarantee that the information needed for personalizing a specific service is already maintained and available in the UM, even if such UM is detailed and up-to-date. In some cases, the UM information may be partially available, in others, some additional computation and reasoning may be needed. In some embodiments, the present invention allows the environment (or service) to interact with the UM, reason about available information, identify missing information and/or provide means for calculating any missing information. In some embodiments, the present invention allows to utilize the UIBUM approach to support the dynamic nature of personalization in ubiquitous computing. In some embodiments, the present invention is directed to a Client-Server architecture, where a client running on any device interacts with any service providing device that provides personalized service that needs some personal information about the user. In some embodiments, the client may download the structure of the UIBUM and add any missing info-beads to complete the composition of the UM.

Exemplary Architecture

Figure 3:
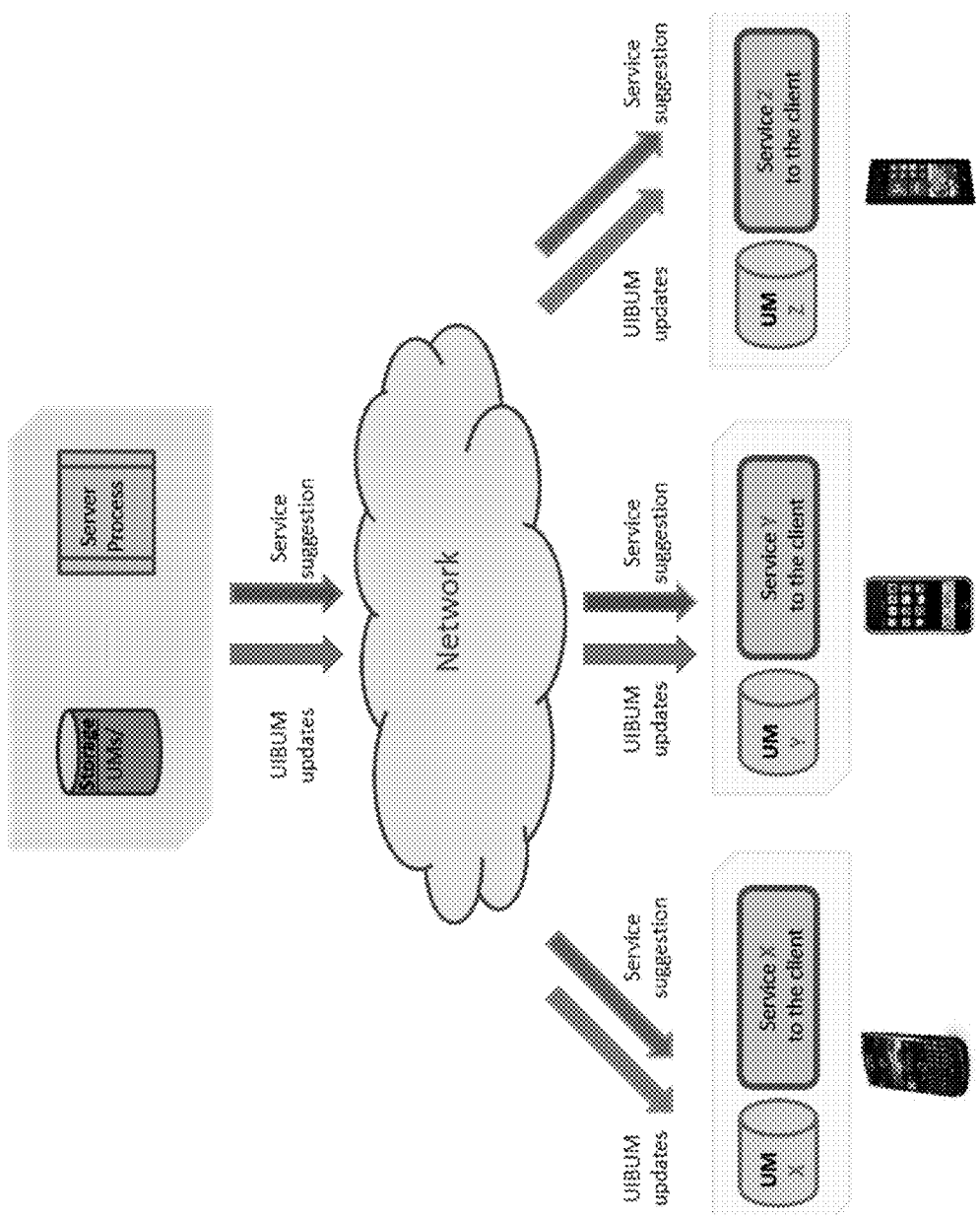
FIG. 3 shows an exemplary inventive computer-implemented system architecture of the present invention, according to an embodiment.

FIG. 3 shows an exemplary inventive computer-implemented system of the present invention, which has at least two main components. During the initiation process the server provides Info-Beads that are required for a personalized service. Then, during runtime, the server delivers to its client application all necessary information (based on user's data spread by the local updated UM running on the mobile device) so it may suggest personalized service to the client.

The first component can be implemented as part of any server that provides a personalized service: a determining mechanism, that is able to analyze and/or compare different UMs and/or an info-bead UM tailored for each specific application, developed by the service provider as for example described by an illustrative example below. For example, this first component can examine and/or identifies info-beads that are not identical/missing in one of the compared UM's.

For example, a file that includes a list of all info-beads included in the UM (and the data links between them) resides alongside the User Model. This file is called an EAM XML configuration file. As the info-beads are delivered from the server and reach the ubiquitous info-beads User Modeling (UIBUM) manager application, they can be stored in an alternative location (to the User Model) on the ubiquitous device (e.g. mobile device). Additionally to the info-beads, an Enterprise Asset Management (EAM) configuration file that lists all new info-beads and the links between them can be delivered from the server.

At this stage, at least one preprogrammed routine is triggered that performs a merge of the "original beads" and the "new beads" folders—all info-beads in the list of the info-beads to be updated, replace the equivalent info-beads in the "beads" folder (we assume that info-beads name is identical to info-beads' class name is used), all info-beads in the list of new info-beads are added to the "beads" folder. Along with those procedures, the EAM configuration files are being merged—all info-beads that should be present after the merge, get an entry in the new EAM. All info-beads that were present in the original EAM file, should be added to the merged EAM file, and all info-beads in the new EAM file, received from the server should be added to the merged file as well.

Once this process is completed, the UIBUM manager application on the ubiquitous device shuts down the currently running UIBUM, then starts it again with an updated set of info-beads.

1.0 Foreach (InfoBead: selectedInfoBead List)
1.1 Add entry <infoBeads> in new XML file
2.0 Foreach (InfoBead: selectedInfoBead List)
2.1 Find all <infoLinks> for that infoBead in old XML (where it is the leftmost—assuming we are going over outgoing links, and all required links will be covered)
2.2 Foreach (infoLinks: List returned in 2.2)
2.2.1 Check if rightmost infoBead is present in selected InfoBead List
2.2.1.1 If present, add entry to new XML with the up-mentioned infoLink.
2.3 Find all <infoLinks> for that infoBead in new XML (where it is the leftmost—assuming we are going over outgoing links, and all required links will be covered)
2.4 For each (infoLinks: List returned in 2.3)
2.4.1 Check if rightmost infoBead is present in selected InfoBead List.
2.4.1.1 If present, add entry to new XML with the up-mentioned infoLink.

An example use case may be the Supermarket chain (ShopME) recommender shopping list. The running info-beads in the user model (UIBUM Manager application) at the initial setting:
1. Age—Version 1234
2. Bank Account—Version 1234
3. BMI—Version 1234
4. Coeliac—Version 1234
5. Descendants—Version 1234
6. Gender—Version 1234
7. Health Insurance Account—Version 1234t
8. Height—Version 1234
9. Id—Version 1234
10. Lactose Intolerance—Version 1234
11. Monthly Expenses—Version 1234
12. Monthly Loans—Version 1234
13. Monthly Salary—Version 1234
14. Net Income—Version 1234
15. Nexus4Location—Version 1234
16. Overweight—Version 1234
17. Season—Version 1234
18. Weight—Version 1234.

During the dynamic update of the UIBUM by the server, the following info-beads can be delivered from the server to the client UIBUM Manager Application:
1. Id—Version 1235—To Update existing Id info-bead in the UM
2. Camper—Version 1234—New info-bead
3. Hobbies—Version 1234—New info-bead
4. Body Builder—Version 1234—New info-bead
5. Shopping List—Version 1234—New info-bead
6. Shopping Preferences—Version 1234—New info-bead.

Table 1 shows an example of running info-beads in the updated UM after the merger of the UIBUM (the ActivatedModel.eam files merger (new with old)).

TABLE 1

Figure 4:
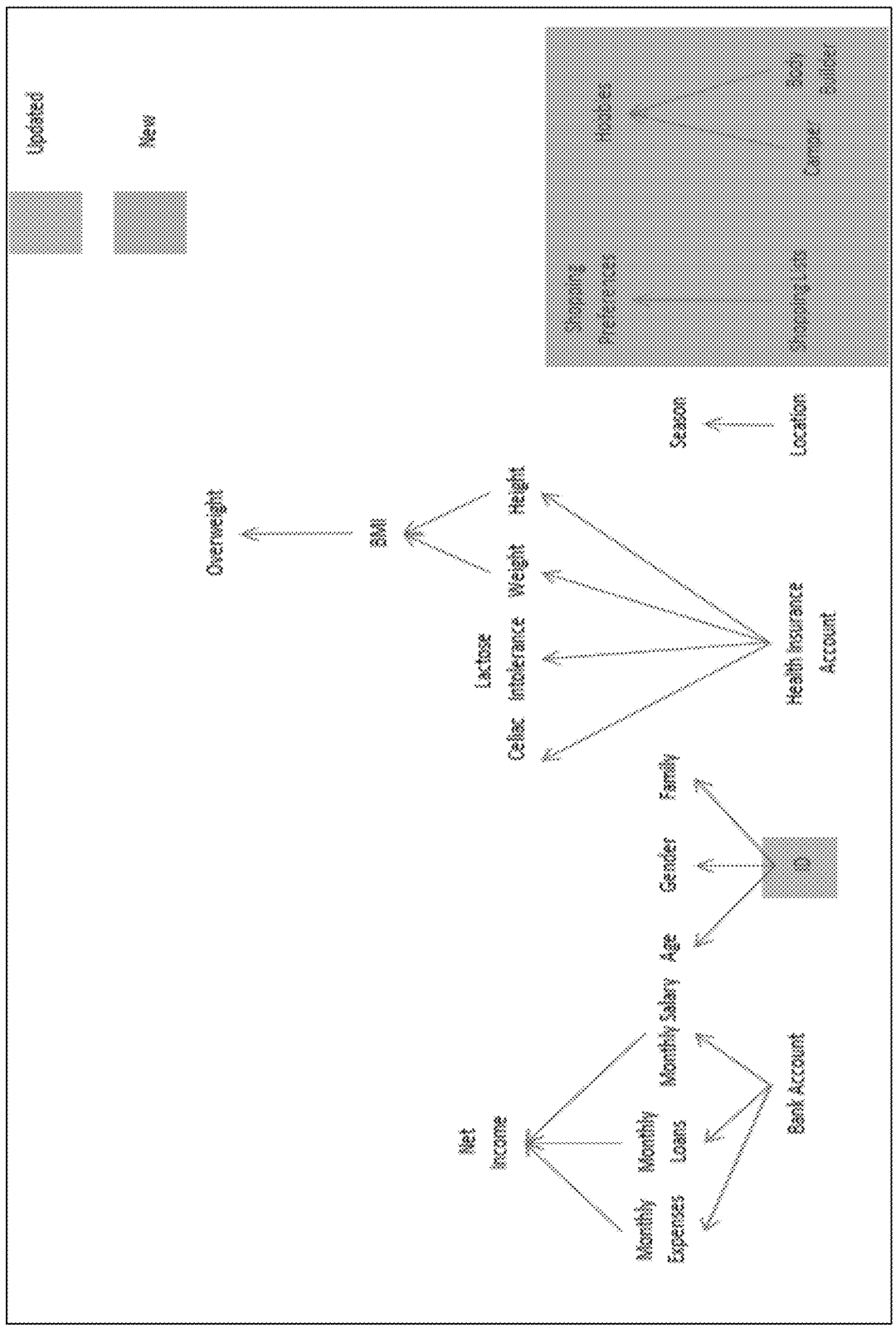
FIG. 4 illustrates an exemplary schema of the info-beads resulted by the merger process and info-beads map, according to an embodiment.

1. Age — Version 1234 — Provides user's age
2. Bank Account — Version 1234 — Provides users bank account entries for the last year
3. BMI — Version 1234 — Provides users BMI value
4. Coeliac — Version 1234 — Provides users Coeliac disease status —Boolean value
5. Descendants — Version 1234 — Provides users descendants information — names, gender, age
6. Gender — Version 1234 — Provides users gender value
7. Health Insurance Account — Version 1234 — Provides users Health Account Information —diseases, blood checks, doctor visits
8. Height — Version 1234 — Provides users height value
9. Id — Version 1235 (updated) — Provides users Id information — Id number, age, name, gender, spouse Id, descendants Id's
10. Lactose Intolerance — Version 1234 — Provides users Lactose Intolerance status — Boolean value
11. Monthly Expenses — Version 1234 — Provides users average monthly expenses calculated based on his bank account entries
12. Monthly Loans — Version 1234 — Provides users average monthly loans return calculated based on his bank account entries
13. Monthly Salary — Version 1234 — Provides users average monthly salary calculated based on his bank account entries
14. Net Income — Version 1234 — Provides users average net income calculated based on his bank account entries TABLE 1-continued 15. Nexus4Location — Version 1234 — Provides users location based on Nexus 4 internal location data (network/GPS)
16. Overweight — Version 1234 — Provides users overweight status based on his BMI
17. Season — Version 1234 — Provides the season at users current location (based on location value)
18. Weight — Version 1234 — Provides users weight value
19. Camper — Version 1234 (New) — Provides users camper (hobby) Boolean value
20. Hobbies — Version 1234 (New) — Provides a list of user's hobbies
21. Body Builder — Version 1234 (New) — Provides users body builder (hobby) Boolean value
22. Shopping List — Version 1234 (New) — Provides users shopping lists (lists of purchases in each shopping event)
23. Shopping Preferences — Version 1234 (New) — Provides the frequency of purchase for each product ever purchased by the user In some embodiments, after the UIBUM merge is performed (the new and updated info-beads that have been received from the server, are merged with currently present info-beads on the ubiquitous device), a new directory of info-beads is created, that includes all info-beads required to support both previously supported personalized services, and the service(s) provided by the new server. FIG. 4 illustrates an exemplary schema of the info-beads resulted by the merger process and info-beads map.

For example, the second component can be a ubiquitous component that allows merging and/or integrating such UMs, using already existing info-beads that reside on the user's ubiquitous device (they may already be active, calculating and providing part or all of the needed information) and/or info-beads downloaded from the server. In some embodiments, the present invention is directed to the user side implementation which can contain/associated/running the following applications:

An exemplary inventive UM Management Application which can be configured to run a local, generic info-bead UM and interact with the server. For example, the exemplary inventive UM Management Application can reveal to the server the configuration of the info-beads that are currently running on the ubiquitous device. For example, the exemplary inventive ubiquitous UM Management Application can handle the process of updating the user's local UM with necessary missing info-beads and restart the updated UM, as, for example shown above regarding the functionalities of the First component. For example, the exemplary inventive UM Management Application can be configured such that the info-bead UM which runs under the framework of this application delivers data per info-bead to relevant service providing server.

Services Applications for relevant service-providing server—the ubiquitous device may run a client application, which shall interact with the server, to receive all necessary data and to provide the user with the personalized service.

On the server side, a Server Application can be run. The exemplary inventive Server Application, per service provider (a smart supermarket network, a smart train authority, etc.), provides a personalized service to a client application running on the ubiquitous device and utilizing the needed personal information. The server side application also holds a complete info-bead UM that is needed for providing a personalized service and contains all the info-beads needed for containing personal data and reasoning about the user's personal information as for example, but limited to, illustrated below.

For example, Table 2 shows an illustrative listing of Supermarket products and characteristic, according to which the exemplary Supermarket server of the above described illustrative example) performs its personalization logic processing. A value in an empty ("don't care") field would not affect the product acceptance for a recommendation, while on the other hand, each field with a specified value describes a condition to be met by customer's characteristics, to cause a recommendation of that value (a conjunction clause).

TABLE 2

| Item | Net Income | Age | Gender | Family | Hobbies | Season | Health | Last Purchase |
|---|---|---|---|---|---|---|---|---|
| Cottage Cheese | | >18 | | | | | Lactose Intolerance | <Week |
| Yogurt | >15k | <55 | | | | | Lactose Intolerance | <Week |
| Cream Cheese | | >55 | | | | | Lactose Intolerance | <Week |
| Milk | >15k | | | Children | | | | <Week |
| Goat Milk | | | | | | | | <Week |
| Rye Bread | | | | | | | | <Week |
| Apples | >15k | <18 | | | | | | <Week |
| Pineapple | >15k | >20 | | | | | Lactose Intolerance | <Week |
| Eggs | >15k | | | | | | | <Week |
| Pasta | | | | | | | | <Week |
| Ice Cream | | | | | | | | <Week |
| Cigarettes | | >18 | | | | | Lactose Intolerance | <Week |
| Beer | >15k | >18 | | | | | Lactose Intolerance | <Week |

TABLE 2-continued

| Item | Net Income | Age | Gender | Family | Hobbies | Season | Health | Last Purchase |
|---|---|---|---|---|---|---|---|---|
| Wine | >15k | >18 | | | | | Lactose Intolerance | <Week |
| Mineral Water | | | | | | | | <Week |

Below is an exemplary list of products which could be delivered by the "Supermarket" server to a front-end application (e.g., ShopME eCommerce WordPress theme) based on the data received from the UIBUM, and performance of personalization logic (e.g., Table 2):

Cottage cheese
Rye Bread
Pineapples
Pasta
Ice Cream
Cigarettes
Beer
Wine
Mineral Water In addition, in some embodiments, the server side can contain at least one component that is able to determine a user model configuration, compare it with the one needed for the service and identify differences in order to decide whether the client's UM needs to be extended.

FIG. 3 shows an exemplary System Architecture in accordance with some embodiments of the present invention. For example, during the initiation process the inventive server provides info-beads that are required for a personalized service. Then on runtime, the server can deliver to its client application all necessary information (based on user's data spread by the local updated UM running on the ubiquitous device) so it may suggest personalized service to the client.

Figure 5:
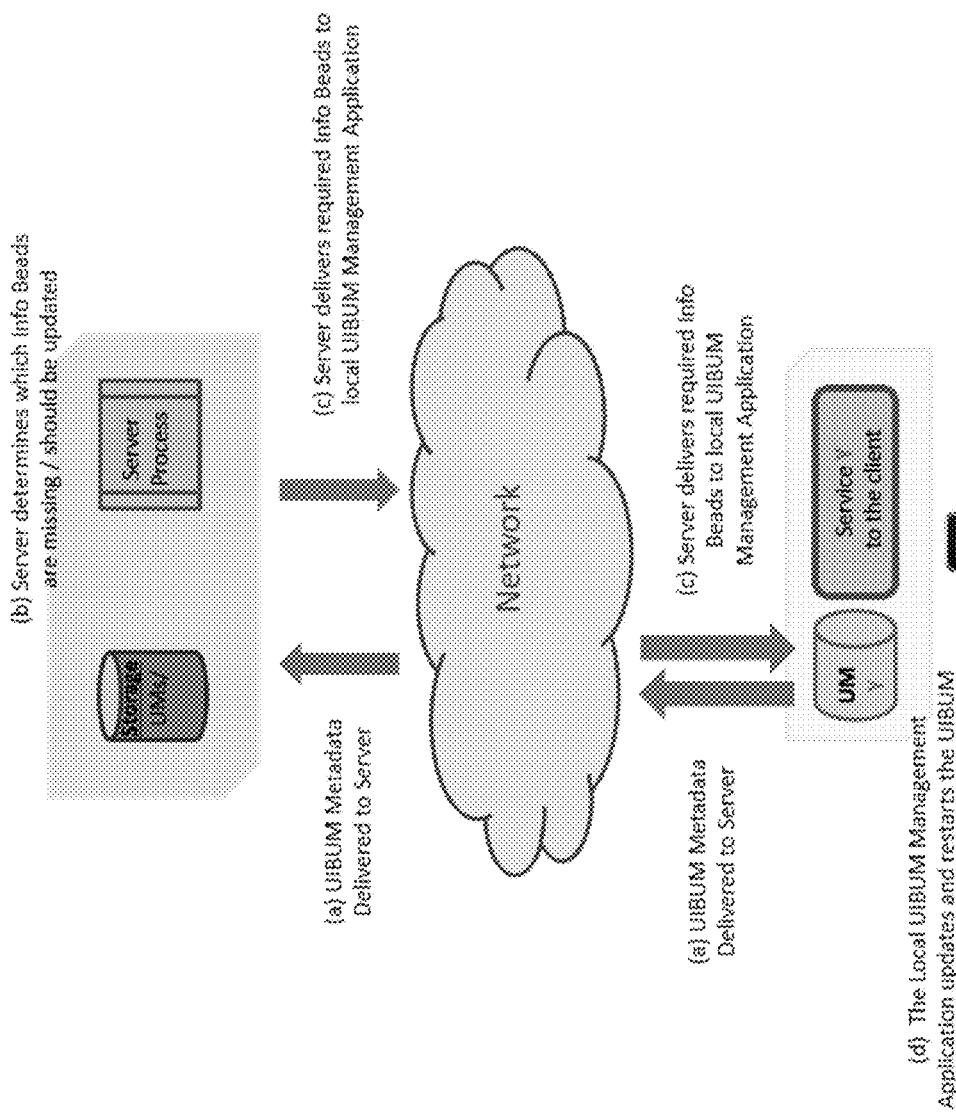
FIG. 5 presents a process for updating and extending the user model, according to an embodiment.

In some embodiments of the present invention, in runtime, the inventive architecture is configured to support interaction with the environment (e.g., mobile devices, smart house, smart city, Internet of Things) to figure out what services are available and what personal information is needed for them. For example, based on the service selected/offered to the user, the inventive system can determine that there is a need to configure the user model accordingly, so personalized service can be delivered. When an interaction between the user and the environment is initiated, as user enters the ubiquitous environment the server suggests a definition of the required personal information it needs and provides the user with Info-Beads required to complete the user model on the mobile device. FIG. 5 presents a process for updating and extending the user model. For example, the following are exemplary steps that can take place in accordance with some embodiments of the present invention:

The user enters a "Service zone" with his mobile device, with a ubiquitous info-beads UM (UIBUM) Management Application running. The user modeling Management Application interacts with the Server Application and delivers the metadata of all info-beads present in the mobile device running a local UIBUM (as for example is shown above in the illustrative example of functionalities of the First component).

The Server Application analyses the received info-beads' metadata and decides, which info-beads are missing in the local UIBUM running on the users' device, and which implement older versions and should be updated, in order to provide a personalized service to the client (as for example is shown above in the illustrative example of functionalities of the First component).

The server sends to the client all required info-beads to the local UIBUM Management Application.

The local UIBUM Management Application on the mobile updates the local UIBUM, restarts the updated version and runs the UM required to provide the personalized service.

Figure 6:
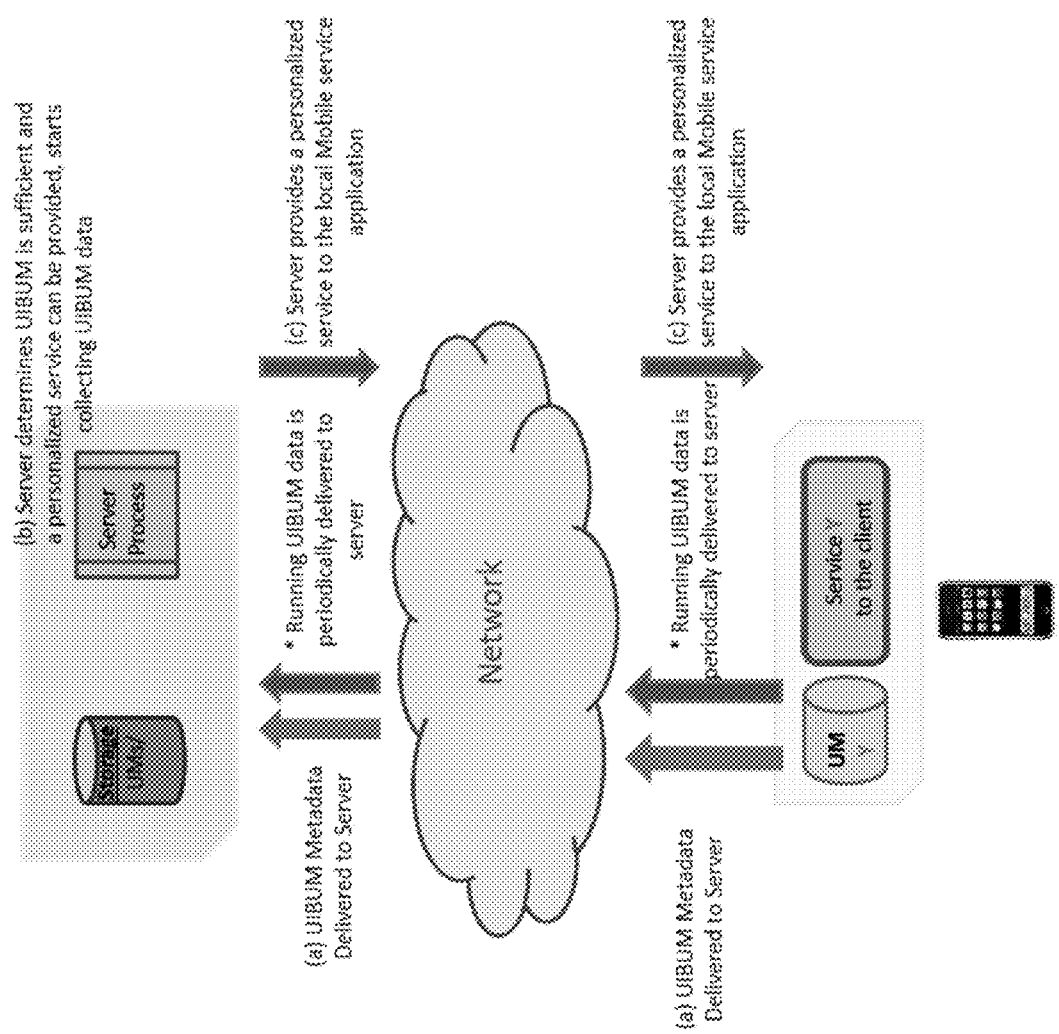
FIG. 6 illustrates runtime user model synchronization and service delivery, according to an embodiment.

C. Runtime: service provision with an updated user model in the case where the user model is already updated, (and after initiation) the system identifies that the model is updated and starts providing a service to the user, as, for example, but not limited to, presented in FIG. 6 (UM synchronization and service delivery).

The user enters a "Service zone" with his mobile device, with a UIBUM Management Application running.

The UM Management Application interacts with the Server Application and delivers the metadata of all info-beads present in the locally running UIBUM.

The Server Application analyses received metadata and decided which info-beads are missing in the local UIBUM running on the user's device, and which should be updated, in order to supply a personalized service to the client (as for example is shown above in the illustrative example of functionalities of the First component).

If no updates are required, a toggle is raised for the service providing logic in the server to begin collecting the data delivered by the user's local UIBUM running on his mobile device, analyzing it and providing a personalized service (as for example is shown above in the illustrative example of functionalities of the First component).

In some embodiments, the present invention provides, among other things, for, a mechanism for dynamic extension and on the fly creating/updating of user models of the info-beads User Modeling approach. In some embodiments, the present invention also provides for the potential of reuse and composition of info-beads. In some embodiments, the present invention allows a real-time creation of user models and moreover, an exchange of personal information between applications in ubiquitous computing without the need for manual definition/bootstrapping of the exemplary model (for example, illustrative model(s) described in U.S. Pat. No. 9,304,746, whose descriptions are hereby incorporated by reference herein). In some embodiments, the present invention allows for the standardization and reusability of the info-beads. In some embodiments, the present invention allows to minimize or eliminate specific development of reasoning components ("resolvers") per application. Specifically, the present invention allows to minimize or eliminate the need for considering the internal structure and content of the UM while transferring the information into what is needed by the application (e.g., avoiding or minimizing change(s) to the user model itself). This requirement is eliminated by the standardization and simplicity of the UIBUM approach.

In some embodiments, the present invention can build upon an exemplary UIBUM methodology describe by [Dim et al.], to create the dynamic extension of user models for service provision in ubiquitous computing.

In some embodiments, for personalization purpose, the present invention can utilize some personal information, that may or may not be available in the user's UM on his/her ubiquitous device (or in the cloud). For example, if some basic information is available and that both the user and the service follow the ubiquitous info-beads paradigm, the present invention allows to extend the user's UM with the missing/new components and the service(s) would receive the information needed for personalizing its service for the benefits of the user. For example, the interaction between the user and the environment can be done by a personal agent residing on the ubiquitous device (or in the cloud) that reasons about the benefits of the personalization vs. disclosing personal information and decides according to pre-defined policies or explicit authorization of the users (as done, for example, nowadays with mobile apps). For example, whenever a service is suggested/requested, the service provider asks for personal information that is needed for the delivery of the service. For example, the user needs to approve revealing this information (somewhat similar to apps installation nowadays). The user may agree or not to disclose the information—this may be done explicitly, as, for example, when mobile apps are installed on our mobile devices, or, this can be automated and done by a personal agent that follows a privacy/security policy that defines what kind of applications may receive what kind of personal information when ask for it. In some embodiments, the present invention allows for configuring and implementing privacy and/or security measures. In some embodiments, the present invention allows for an interaction between smart environments and their inhabitants, the use of existing user model components.

Illustrative Operating Computing Environments

Figure 7:
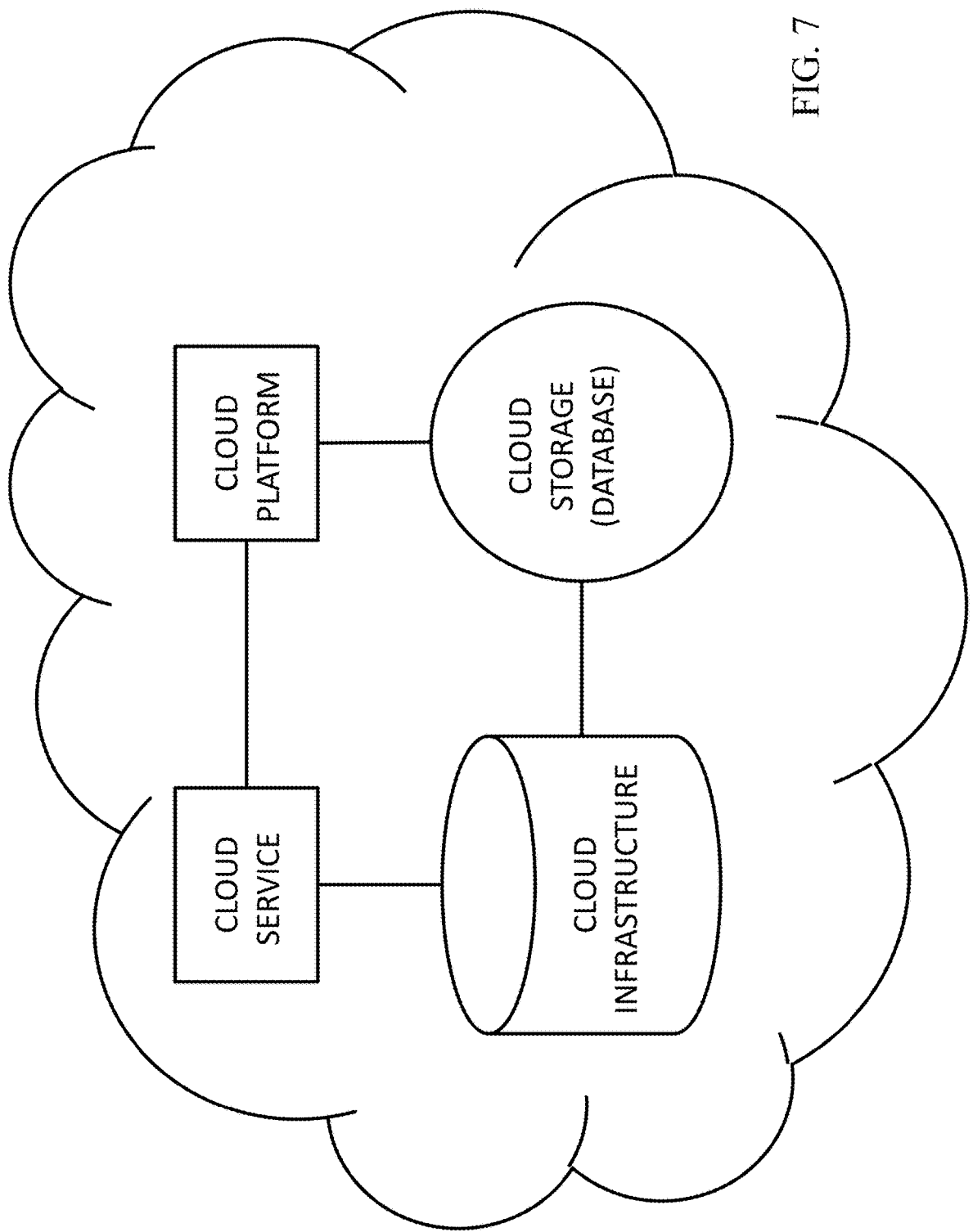
FIGS. 7-8 illustrate schematics of exemplary implementations of cloud computing/architecture which can be utilized by the exemplary specifically programmed engine of the present invention, according to an embodiment.

FIG. 7 illustrates one embodiment of an environment in which the illustrative specifically programmed computer system of the present invention can operate in. However, not all of these components may be required to practice the invention, and variations in the arrangement and type of the components may be made without departing from the spirit or scope of the invention. In some embodiments, the inventive system and method may include a large number of members (e.g., users), described herein, and/or concurrent transactions, such as, but not limited to, personalized services offered (e.g., at least 10; at least 100; at least 1,000; at least, 10,000; at least 1,000,000; etc.). In other embodiments, the inventive system and methods are based on a scalable computer and network architecture that incorporates varies strategies for assessing the data, caching, searching, and database connection pooling. An example of the scalable architecture is an architecture that is capable of operating multiple servers.

In some embodiments, users of the exemplary inventive computer-programmed system of the present invention can utilize 1 . . . N computing devices (e.g., smartphones) which are specifically programmed to receiving and sending messages over a network, such as network, to and from 1 . . . N servers, each other, and the like. In embodiments, the set of such devices includes devices that typically connect using a wired communications medium such as personal computers, multiprocessor systems, microprocessor-based or programmable consumer electronics, network PCs, and the like. In some embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any ubiquitous device, and the like. Similarly, in some embodiments, each of 1 . . . N users' devices can be any device that is capable of connecting using a wired or wireless communication medium such as a PDA, POCKET PC, wearable computer and the like, any ubiquitous computing device such as sensors, data collectors, activators, actuators, switches and the like, any component of a ubiquitous environment component such as Internet of Things, smart home, smart city, autonomous cars and the like, and any other device that is equipped to communicate over a wired and/or wireless communication medium.

In some embodiments, each member device within member devices may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, . Net, QT, C, C++ or other suitable programming language.

In some embodiments, each member device within devices may be configured to receive or measure information from the environment and/or send information to the environment and/or actuators and/or the like, for example, for measuring and controlling lighting, temperature, information system, entertainment or other utilities.

In some embodiments, a client application may be any mean for collecting data in regards to the user or his/her environments; or any device providing processing, or services, or utilities, or applications, or activities, or functionalities, or any other response to the user.

In some embodiments, a client may be any device containing a client application.

In some embodiments, there may be several clients. Clients may be able to exchange data among them and with a server or servers.

In some embodiments, the term server may refer to any computerized system that defines the structure of a UIBUM or holds a repository of info-beads or holds a repository of versions of info-beads, or contains or operates the UIBUM management application, or provides the personalized services to the end user, or utilize UM data, or process UM data, and the like.

In some embodiments, there may be several servers. Servers may be able to exchange data among them and with a client.

In some embodiments, users' devices may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or any proprietary protocol.

In some embodiments, the network may be configured to couple one computing device to another computing device to enable them to communicate. In some embodiments, the network may be enabled to employ any form of computer readable media for communicating information from one electronic device to another. Also, in some embodiments, the network may include a wireless interface, and/or a wired interface, such as the Internet, in addition to local area networks (LANs), wide area networks (WANs), direct connections, such as through a universal serial bus (USB) port, other forms of computer-readable media, or any combination thereof. In some embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, the network includes any communication method by which information may travel between client devices and servers and.

Figure 8:
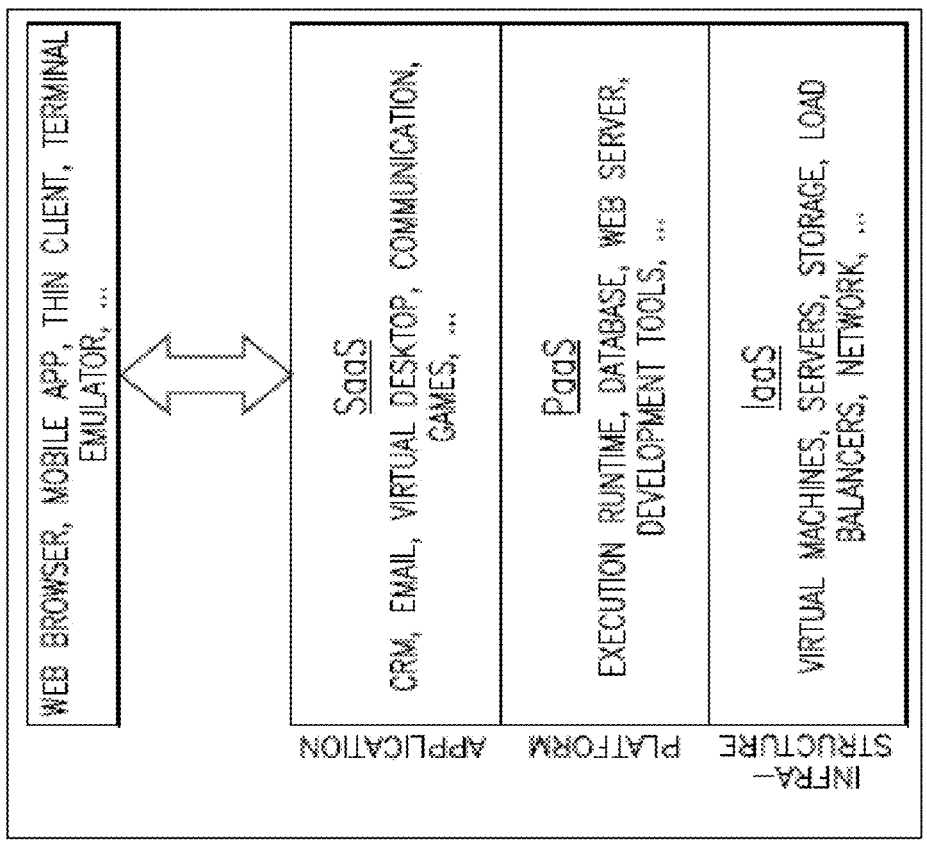

FIG. 8 shows another exemplary embodiment of the computer and network architecture that can support the exemplary inventive specifically programmed systems of the present invention, and the exemplary inventive computer-processing methods of the present invention. In some embodiments, the user devices each at least includes a computer-readable medium, such as a random access memory (RAM) coupled to a processor or FLASH memory. In some embodiments, the processor may execute computer-executable program instructions stored in memory. In some embodiments, such processors comprise a microprocessor, an ASIC, and state machines. In some embodiments, such processors comprise, or may be in communication with, media, for example computer-readable media, which stores instructions that, when executed by the processor, cause the processor to perform the steps described herein.

In some embodiments, types of computer-readable media may include, but are not limited to, an electronic, optical, magnetic, or other storage or transmission device capable of providing a processor, such as the processor of a client with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, and JavaScript.

In some embodiments, member devices may also comprise a number of external or internal devices such as a mouse, a CD-ROM, DVD, a keyboard, a display, or other input or output devices. Examples of 1 . . . N client devices may be personal computers, digital assistants, personal digital assistants, cellular phones, mobile phones, smart phones, pagers, digital tablets, laptop computers, Internet appliances, ubiquitous devices, and other processor-based devices. In general, a client device may be any type of processor-based platform that is connected to a network and that interacts with one or more application programs. In some embodiments, the 1 . . . N client devices may operate on any operating system capable of supporting a browser or browser-enabled application, such as Microsoft, Inc.'s Windows™, Google, Inc.'s Android™, Apple, Inc.'s iOS™, Linux, or any other operating system. In some embodiments, the client devices shown may include, for example, personal computers executing a browser application program such as Microsoft, Inc.' Internet Explorer™, Apple Computer, Inc.'s Safari™, Mozilla Firefox, and Opera. Through the client devices, users can communicate over the network with each other and with other systems and devices coupled to the network. As shown in FIG. 8, server devices and may be also coupled to the network.

In an embodiment of the present invention, one or more clients can be a ubiquitous device such as a mobile device or a static sensor or actuator. In some embodiments, the term "ubiquitous device" may refer to any device that may or may not be enabled with location tracking functionality. For example, a ubiquitous device can include, but is not limited to, a mobile phone, Personal Digital Assistant (PDA), Blackberry™, Pager, Smartphone, sensor, activator, actuator, or any other reasonable electronic device. For ease, at times the above variations are not listed or are only partially listed, this is in no way meant to be a limitation.

In some embodiments, the inventive computer engines of the present invention can utilize any form of location tracking technology or locating method. For example, the terms "proximity detection," "locating," "location data," "location information," and "location tracking" as used herein may refer to any form of location tracking technology or locating method that can be used to provide a location of a ubiquitous device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, the inventive computer engines of the present invention can utilize near-field wireless communication (NFC) can represent a short-range wireless communications technology in which NFC-enabled devices are "swiped," "bumped," "tap" or otherwise moved in close proximity to communicate and gather relevant live stream data. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

For purposes of the instant description, the terms "cloud," "Internet cloud," "cloud computing," "cloud architecture," and similar terms correspond to at least one of the following utilized by the exemplary inventive computer-programmed systems and the exemplary inventive computer-processing methods of the present invention: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive computer flexible lease basis system offers/manages the cloud computing/architecture such as, but not limiting to infrastructure as a service (IaaS), platform as a service (PaaS), and software as a service (SaaS). (4) ubiquitous environments connecting a large number of devices such as, but not limiting to Internet of Things (IoT), smart home, smart city, and autonomous car. FIGS. 7-8 illustrate schematics of exemplary implementations of the cloud computing/architecture which can be utilized by the exemplary specifically programmed engine of the present invention.

Of note, the embodiments described herein may, of course, be implemented using any appropriate specialized hardware and/or computing software languages; for example, the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. Further still, the various steps of herein detailed methods may be carried out in any desired order (and any desired steps may be added and/or any desired steps may be eliminated).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method comprising:
   automatically providing, by a client device to a server, information regarding the identity of data components comprising a user model stored at the client device, wherein each of said data components is associated with an attribute of a user of the client device;
   automatically identifying, by said server, data components that are missing in said user model, based, at least in part, on a reference model stored at said server;
   automatically sending, by said server, to said client device, said identified missing data components;
   automatically updating, by said client device, said user model to include said identified missing data components; and
   automatically sending, by said client device, data contained in one or more of said data components in said updated user model, to enable a service provided by said server.

2. The method of claim 1, wherein said providing occurs when said client device enters a service zone controlled by said server.

3. The method of claim 1, wherein said attributes are associated with at least one of health traits, fitness traits, gender, age, preferences, physical traits, income, education, mental state, fitness activities, leisure activities, environmental parameters, and location of said user.

4. The method of claim 1, wherein at least some of said data components in said user model are configured to exchange data with one another.

5. The method of claim 1, wherein at least some of said data components are based, at least in part, on data obtained from one or more other data components.

6. The method of claim 1, wherein said updating comprises generating at least one of said identified missing data component from data received from an external computing platform.

7. The method of claim 1, wherein said updating comprises generating at least one of said identified missing data component from data received from another data component.

8. The method of claim 1, wherein said client device is one of a smart phone, a tablet, a personal computer, a laptop computer, and an internet appliance.

9. The method of claim 1, wherein said server is a cloud-based server.

10. The method of claim 1, wherein said enabling comprises personalizing said service for said user based, at least in part, on said sending.

11. A system comprising:
    at least one hardware processor; and
    a non-transitory computer-readable storage medium having stored thereon program code, the program code executable by the at least one hardware processor to:
    automatically provide, by a client device to a server, information regarding the identity of data components comprising a user model stored at the client device, wherein each of said data components is associated with an attribute of a user of the client device;
    automatically identify, by said server, data components that are missing in said user model, based, at least in part, on a reference model stored at said server;
    automatically send, by said server, to said client device, said identified missing data components;
    automatically update, by said client device, said user model to include said identified missing data components; and
    automatically send, by said client device, data contained in one or more of said data components in said updated user model, to enable a service provided by said server.

12. The system of claim 11, wherein said providing occurs when said client device enters a service zone controlled by said server.

13. The system of claim 11, wherein said attributes are associated with at least one of health traits, fitness traits, gender, age, preferences, physical traits, income, education, mental state, fitness activities, leisure activities, environmental parameters, and location of said user.

14. The system of claim 11, wherein at least some of said data components in said user model are configured to exchange data with one another.

15. The system of claim 11, wherein at least some of said data components are based, at least in part, on data obtained from one or more other data components.

16. The system of claim 11, wherein said updating comprises generating at least one of said identified missing data component from data received from an external computing platform.

17. The system of claim 11, wherein said updating comprises generating at least one of said identified missing data component from data received from another data component.

18. The system of claim 11, wherein said client device is one of a smart phone, a tablet, a personal computer, a laptop computer, and an internet appliance.

19. The system of claim 11, wherein said server is a cloud-based server.

20. The system of claim 11, wherein said enabling comprises personalizing said service for said user based, at least in part, on said sending.

* * * * *